(12) United States Patent
Limbert et al.

(10) Patent No.: US 11,428,884 B2
(45) Date of Patent: Aug. 30, 2022

(54) FIBRE OPTIC ACCESSORY

(71) Applicant: RIDGEMOUNT TECHNOLOGIES LIMITED, Bicester (GB)

(72) Inventors: Mark John Limbert, Oxfordshire (GB); Christopher Russell Peters, Oxfordshire (GB)

(73) Assignee: RIDGEMOUNT TECHNOLOGIES LIMITED, Bicester (GB)

( * ) Notice: Subject to any disclaimer, the term of this patent is extended or adjusted under 35 U.S.C. 154(b) by 83 days.

(21) Appl. No.: 16/994,013

(22) Filed: Aug. 14, 2020

(65) Prior Publication Data

US 2020/0379199 A1 Dec. 3, 2020

Related U.S. Application Data

(63) Continuation of application No. 16/470,494, filed as application No. PCT/GB2017/053699 on Dec. 8, 2017, now Pat. No. 10,775,578.

(30) Foreign Application Priority Data

Jan. 5, 2017 (GB) ..................... 1700124

(51) Int. Cl.
*G02B 6/44* (2006.01)
*G02B 6/38* (2006.01)
(Continued)

(52) U.S. Cl.
CPC ......... *G02B 6/4438* (2013.01); *G02B 6/3849* (2013.01); *G02B 6/4464* (2013.01);
(Continued)

(58) Field of Classification Search
CPC .. G02B 6/3821; G02B 6/3849; G02B 6/3869; G02B 6/3893; G02B 6/4438;
(Continued)

(56) References Cited

U.S. PATENT DOCUMENTS

| 5,884,384 A | 3/1999 | Griffioen |
| 9,285,559 B1 | 3/2016 | Stockton et al. |

(Continued)

FOREIGN PATENT DOCUMENTS

| CN | 204631309 U | 9/2015 |
| DE | 10003695 A1 | 8/2001 |

(Continued)

OTHER PUBLICATIONS

International Search Report and Written Opinion of the International Searching Authority issued in International Application No. PCT/GB2017/053699 dated Mar. 8, 2018.

(Continued)

*Primary Examiner* — Michael P Mooney
(74) *Attorney, Agent, or Firm* — Foley & Lardner LLP

(57) ABSTRACT

A fibre optic accessory for attachment to the end of an optical fibre is described, the fibre optic accessory comprising a plurality of grooves extending longitudinally along a portion of its outer surface. Using this accessory, an optical fibre to which this accessory is affixed may be installed in an installation tube with the use of a source of compressed air. A kit of parts for such an installation, an optical fibre and a method of installation are also described.

16 Claims, 5 Drawing Sheets

(51) Int. Cl.
*G02B 6/46* (2006.01)
*G02B 6/50* (2006.01)
*G02B 6/52* (2006.01)

(52) U.S. Cl.
CPC .................. *G02B 6/46* (2013.01); *G02B 6/50* (2013.01); *G02B 6/52* (2013.01)

(58) Field of Classification Search
CPC ...... G02B 6/4464; G02B 6/4485; G02B 6/50; G02B 6/52; G02B 6/46
See application file for complete search history.

(56) References Cited

U.S. PATENT DOCUMENTS

| | | | |
|---|---|---|---|
| 10,775,578 B2 * | 9/2020 | Limbert | G02B 6/4464 |
| 10,895,698 B2 * | 1/2021 | Nhep | G02B 6/3847 |
| 2008/0011990 A1 * | 1/2008 | Kostet | G02B 6/4464 |
| | | | 254/134 |
| 2010/0008629 A1 | 1/2010 | Fantini | |
| 2014/0133810 A1 | 5/2014 | Schneider et al. | |
| 2015/0268437 A1 * | 9/2015 | Chen | G02B 6/4464 |
| | | | 385/100 |

FOREIGN PATENT DOCUMENTS

| | | |
|---|---|---|
| EP | 1 396 745 A2 | 3/2004 |
| EP | 2 492 730 A1 | 8/2012 |
| EP | 3 285 102 | 2/2018 |
| GB | 2 509 532 A | 7/2014 |
| WO | WO-2016/184014 | 11/2016 |

OTHER PUBLICATIONS

Patents Act 1977: Search Report under Section 17(5) issued in Application No. GB1700124.9 dated May 10, 2017.
International Preliminary Report on Patentability and Written Opinion of the International Searching Authority issued in International Application No. PCT/GB2007/053699 dated Jul. 9, 2019, 8 pages.

* cited by examiner

FIBRE OPTIC ACCESSORY

CROSS-REFERENCE TO RELATED APPLICATIONS

This application is a continuation of U.S. patent application Ser. No. 16/470,494, filed Jun. 17, 2019, which is a National Stage of PCT/GB2017/053699, filed Dec. 8, 2017, which claims priority under 35 U.S.C. § 119 to GB Application No. 1700124.9, filed Jan. 5, 2017, all of which are incorporated herein by reference in their entirety.

FIELD OF THE INVENTION

The present invention relates to a fibre optic accessory, and more particularly to a fibre optic accessory for attachment to the end of an optical fibre.

BACKGROUND TO THE INVENTION

Optical fibres are frequently installed with the use of installation tubes. Here, in the first step of the installation process, an installation tube is positioned between two locations to carry an optical fibre to the desired destination. As the installation tube is put in place, the curvature of the tube at any specific position may be reviewed, ensuring the radius of curvature does not extend beyond the operational limits of the optical fibre to be inserted. In this way, the reliability of the optical fibre may be improved.

Subsequently, the optical fibre is fed through the installation tube. The optical fibre may be fed through the installation tube using a variety of methods, for example via traditional cable pulling using a winch line. However, more recently, cable jetting or blowing has also been used to feed optical fibres through an installation line.

In the process of cable jetting, the optical fibre is blown through the installation tube with the use of compressed air. Here, compressed air is introduced at an opening in the installation tube, such that it flows along the installation tube at high speed. Where the optical fibre is inserted into the installation tube, the high-speed air propels the optical fibre due to both the associated drag forces and pressure drop along the length of the installation tube. The friction of the optical fibre against the installation tube is reduced by the airflow, which acts as a buffer between the optical fibre and the installation tube.

When using cable jetting or blowing, the airflow expands down the length of the installation tube. As such, the propelling force due to the action of the air is relatively small at the opening, and relatively large at the air exhaust end of the installation tube. To compensate for this effect, a pushing force is often exerted on the optical fibre by supplementary equipment, increasing the maximum jetting distance considerably.

However, using existing techniques, jetting is not suitable for all kinds of optical fibre. For example, the installation of pre-assembled, industry standard, fibre optic interface (SC connectors) via jetting through an installation tube remains an impossibility. Here the large, bulky SC connector (Standard Connector or Subscriber Connector) located at the end or terminus of the optical fibre is too large to enter into the installation tube, and hence the jetting process cannot be used for installation.

SUMMARY OF THE INVENTION

According to a first aspect of the present invention, there is provided a fibre optic blowing or jetting accessory for attachment to the end of an optical fibre, the fibre optic accessory comprising a plurality of grooves extending longitudinally along a portion of its outer surface.

In this way, there is provided a blowing or jetting accessory for attachment to the end of an optical fibre that creates an air cushion around the accessory during a blowing or jetting process. As such, friction between the accessory and an installation tube is reduced, increasing the ease with which an attached optical fibre may be installed.

In addition to the provision of the air cushion, the presence of a grooved surface on the accessory results in a reduced contact area between the accessory and any installation tube, resulting in a further reduction in friction. Therefore, the use of a fibre optic blowing accessory may prove advantageous in providing reduced friction, improved speed of deployment and greater potential installation range when installing an optical fibre.

Preferably, the fibre optic blowing accessory is a fibre optic ferrule. Preferably, the fibre optic blowing accessory is a dust cap. More preferably, the fibre optic blowing accessory is comprises both a fibre optic ferrule and a dust cap. Still more preferably, the fibre optic blowing accessory comprises a fibre optic ferrule and a dust cap in combination.

Preferably, the plurality of grooves or channels run parallel to one another. Preferably the plurality of grooves run substantially parallel to a longitudinal axis of the fibre optic accessory. More preferably, the plurality of grooves run parallel to a longitudinal axis of the fibre optic accessory.

Preferably, a majority of the grooves which comprise the plurality of grooves are equally distributed around a perimeter of the fibre optic accessory. More preferably, the grooves which comprise the plurality of grooves are equally distributed around a perimeter of the fibre optic accessory. Preferably, a majority of the grooves which comprise the plurality of grooves are evenly spaced around a perimeter of the fibre optic assembly. More preferably, the grooves which comprise the plurality of grooves are evenly spaced around a perimeter of the fibre optic assembly.

Preferably the plurality of grooves comprises at least 4 grooves, more preferably comprises at least 8 grooves, still more preferably comprises at least 16 grooves, even more preferably comprises at least 24 grooves and most preferably comprises at least 32 grooves.

Preferably, the plurality of grooves extends longitudinally along the majority of the outer surface of the fibre optic assembly. More preferably, the plurality of grooves extends longitudinally along the entire outer surface of the fibre optic assembly.

Preferably, a portion of the fibre optic accessory comprises an asymmetric D profile. More preferably, the portion of the fibre optic accessory that comprises an asymmetric D profile is adjacent to an end of the fibre optic accessory.

Preferably, where the fibre optic accessory comprises both a fibre optic ferrule and a dust cap, both the fibre optic ferrule and the dust cap comprise a plurality of grooves extending longitudinally along a portion of their outer surfaces.

Preferably, where the fibre optic accessory comprises both a fibre optic ferrule and a dust cap, the fibre optic ferrule or the dust cap comprises engagement means to locate the fibre optic ferrule and the dust cap in a position adjacent each other. More preferably, this engagement means is a tab or member extending from the dust cap, to be located within a slit or recess in the fibre optic ferrule. Alternatively, this engagement means is a tab or member extending from the fibre optic ferrule, to be located within a slit or recess in the dust cap.

More preferably, the engagement means locates the fibre optic ferrule and the dust cap in a position such that the plurality of grooves extends substantially continuously across both the dust cap and the fibre optic ferrule.

Preferably, the grooves which comprise the plurality of grooves have a semi-circular cross section. Preferably, the grooves have a smooth surface. Preferably, the cross section of the groove has a constant radius of curvature along at least one of its sides.

Preferably, the fibre optic blowing accessory is attached to an optical fibre. More preferably the fibre optic blowing accessory is factory fitted to an optical fibre. Here, we define factory fitted to mean where the fibre optic blowing accessory is attached to the optical fibre in a workshop environment, more preferably an industrialised workshop environment. More preferably, the fibre optic blowing accessory is attached to an optical fibre is to provide a pre-terminate assembly. Most preferably, the fibre optic blowing accessory is attached to an optical fibre to provide a 'plug-and play' accessory, where no splicing of the optical fibre or adjustment of the optical parameters of the fibre optic blowing accessory are required at the site where the optical fibre is to be installed.

According to a second aspect of the invention, there is provided a kit of parts including a fibre optic blowing accessory as described herein and an installation tube, wherein the fibre optic accessory has an outer diameter between 75% and 85% of the inner diameter of the installation tube.

In relation to the second aspect of the invention, it may be preferable for the kit of parts to further comprise a connector interface for fixing to the fibre optic blowing accessory. More preferably, the kit of parts comprises the component parts required to construct, assemble, or form a connector interface. Still more preferably, the connector interface is an SC or FC connector.

According to a third aspect of the present invention, there is provided a method of installing an optical fibre in an installation tube, the method comprising providing an optical fibre terminated in a fibre optic blowing accessory comprising a plurality of grooves extending longitudinally along a portion of its outer surface, inserting the end of the optical fibre terminated with the fibre optic blowing accessory into an installation tube, and providing a source of compressed air to the installation tube, such that the both the fibre optic blowing accessory and the attached optical fibre are blown down the length of the installation tube.

As such, an improved method of installing an optical fibre is provided.

Preferably, the fibre optic blowing accessory has an outer diameter between 75% and 85% of the inner diameter of the elongate installation tube.

Preferably, the fibre optic blowing accessory is the fibre optic accessory described herein.

DETAILED DESCRIPTION

Embodiments of the present invention will now be described by way of example only and with reference to the accompanying drawings, in which.

Figure 1:
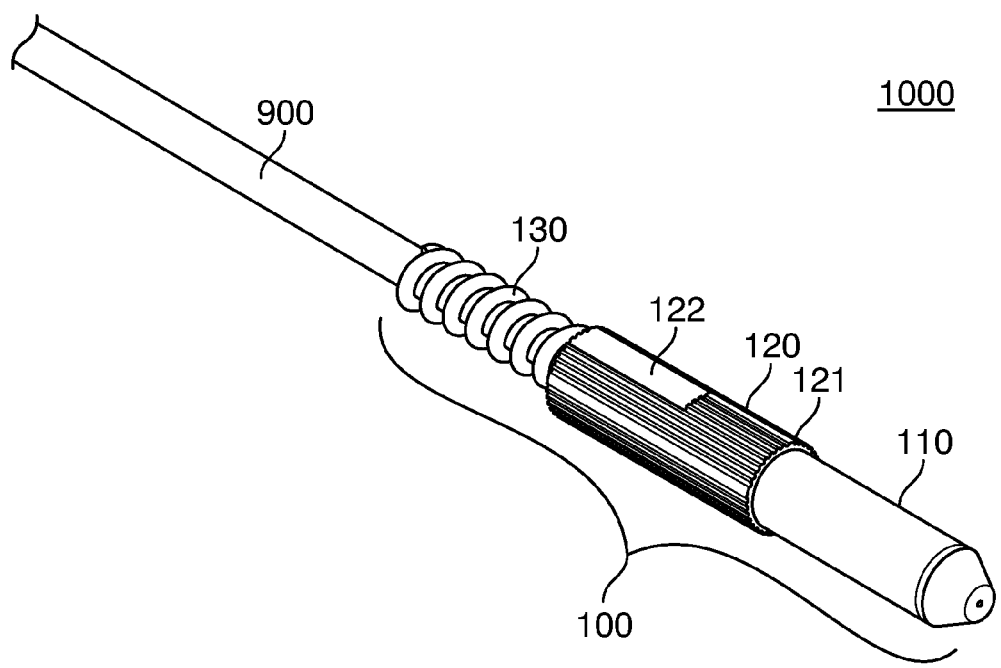
FIG. 1 is a schematic view of a fibre optic ferrule connected to an optical fibre in accordance with the present invention.

Referring to FIG. 1 of the drawings, there is shown a fibre optic system 1000, comprising a fibre optic ferrule sub assembly 100 in accordance with the present invention. Here, the fibre optic ferrule sub assembly 100 comprises a termination piece 110, a ferrule holder 120 and a compression spring 130. The compression spring 130 is retained proximate the ferrule holder 120 via an interference fit. Each of the termination piece 110, the ferrule holder 120 and the compression spring 130 are located such that the surround or enclose an optical fibre 900. The termination piece 110 comprises a ceramic, most commonly a precision zirconia ceramic, whilst the ferrule holder 120 comprises a metal. In this assembly, the termination piece 110 is found at the terminus or end of the optical fibre 900, with the ferrule holder 120 extending from the termination piece 110, and the compression spring 130 extending from the ferrule holder 120 along the length of the optical fibre 900.

The ferrule holder 120 comprises a plurality of grooves, indentations, or ridges 121. This plurality of grooves 121 extends longitudinally along the ferrule holder 120, such that the plurality of grooves 121 cover the majority of the surface of the ferrule holder 120. Each of the grooves which form the plurality of grooves 121 are parallel with one another, forming a series of linear, parallel indentations or channels which extend longitudinally along the outer surface of the ferrule holder 120.

The individual grooves which form the plurality of grooves 121 are equally spaced around the perimeter of the ferrule holder 120. Additionally, the majority of the individual grooves which form the plurality of grooves 121 are evenly spaced in relation to each other.

Whilst a portion of the ferrule holder 120 has a generally circular cross section, a second portion 122 of the ferrule holder 120 has an asymmetric D profile. Whilst the plurality of grooved lines 121 does extend onto the outer surface of this second section 122, areas of the second section 122 do not comprise grooves on the outer surface. Here, the sections of the outer surface of the second section 122 which diverge from the generally circular cross section of the ferrule holder 120 are those where the outer surface is not grooved.

Figure 2:
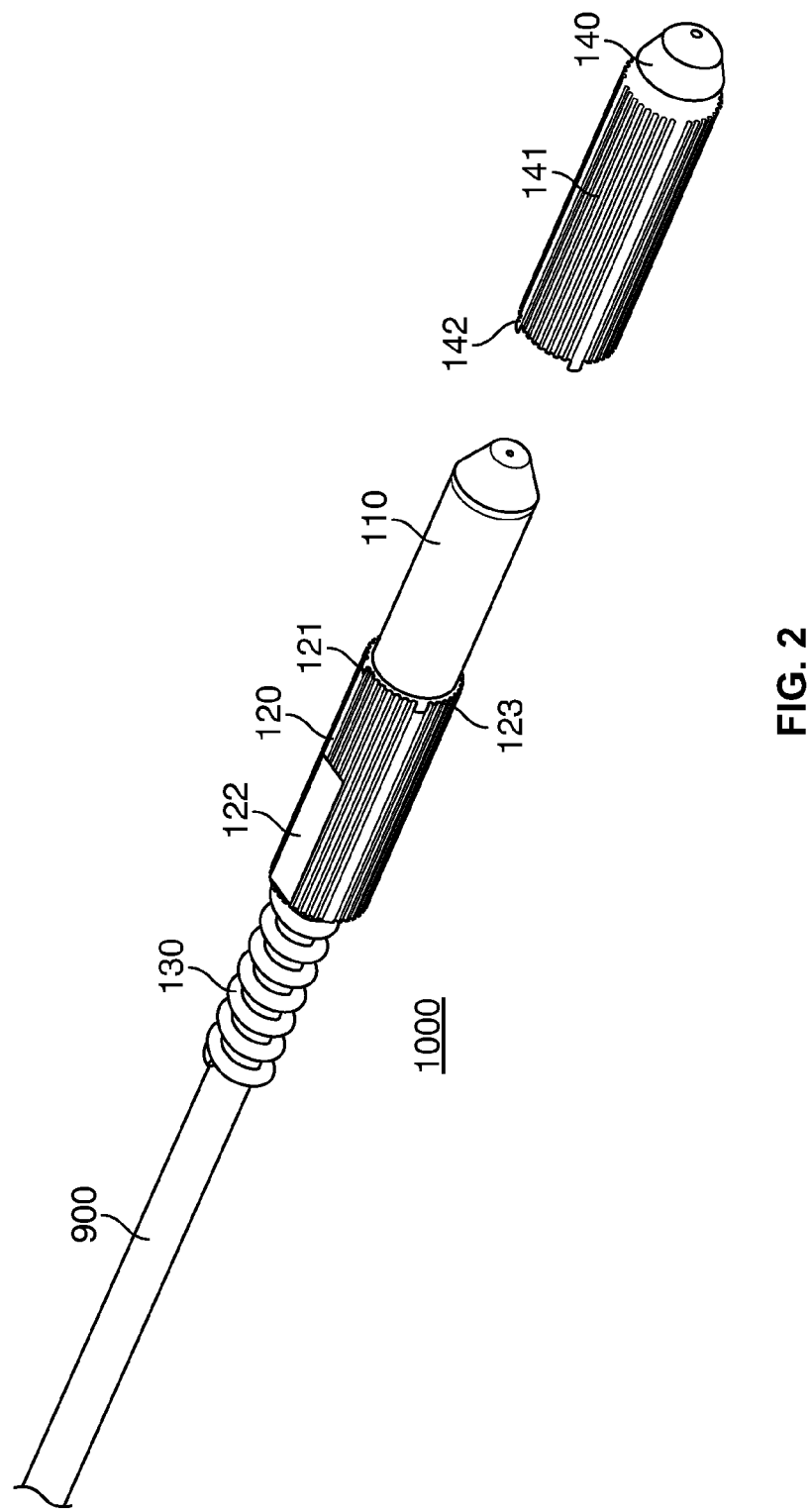
FIG. 2 is a schematic view of a fibre optic ferrule connected to an optical fibre and a dust cap in accordance with the present invention.

FIG. 2 additionally illustrates a dust cap 140. The dust cap 140 is aerodynamically profiled, with a tapered end extending into an elongate, cylindrical section. As such, the dust cap 140 is shaped similarly to a bullet. In a similar fashion to the ferrule holder 120, where the outer surface comprises a plurality of grooves 121, the outer surface of the dust cap 140 comprises a second plurality of grooves 141. Again, the second plurality of grooves 141 extend longitudinally along the dust cap 140, such that the second plurality of grooves 141 cover the majority of the surface of the dust cap 140. Each of the grooves which form the second plurality of grooves 141 are parallel with one another, forming a series of linear, parallel indentations or channels which extend longitudinally along the outer surface of the dust cap 140.

The individual grooves which form the second plurality of grooves 141 are equally spaced around the perimeter of the dust cap 140. Additionally, the majority of the individual grooves which form the second plurality of grooves 141 are evenly spaced in relation to each other. Whilst the majority of the outer surface of the dust cap 140 comprises the second plurality of grooves 141, a portion of the tapered end of the dust cap 140 is free from grooves, with a generally smooth surface.

The dust cap 140 is sized to fit the termination piece 110, such that the termination piece 110 is enclosed by the dust cap 140. The dust cap 140 is held in position on the termination piece 110 with an interference fit. Here, the dust cap 140 has a central cavity with a similar cross section to that of the termination piece 11. When the termination piece 110 is inserted into this central cavity, the interaction between the termination piece and the walls of the central cavity provides the interference fit.

The dust cap 140 further includes a series of engagement tabs 142. These engagement tabs extend from the end of the dust cap 140 proximate the central cavity, parallel to the longitudinal axis of the dust cap 140. When the termination piece 110 is inserted fully into the central cavity of the dust cap 140, the engagement tabs 142 are inserted into receiving slots 123 located at the end of the ferrule holder proximate the termination piece 110. When the engagement tabs 142 are located in the receiving slots 123, the dust cap 140 and the ferrule holder 120 are positioned such that the plurality of grooves 121 located on the ferrule holder and the second plurality of grooves 141 located on the dust cap are aligned. When the plurality of grooves 121 and the second plurality of grooves 141 are aligned, the grooves extend continuously across the join between the ferrule holder 120 and the dust cap 140. As such, the grooves are continuous across substantially the entire length of the fibre optic ferrule 100.

Figure 3:
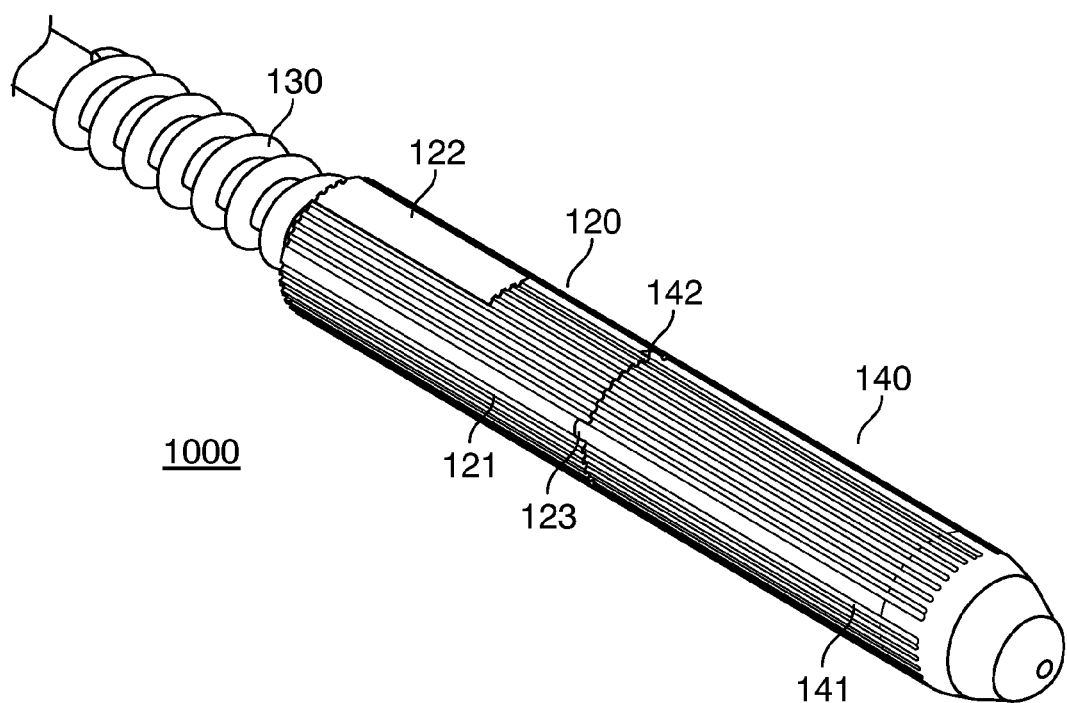
FIG. 3 is an alternative schematic view of a connected fibre optic ferrule connected to an optical fibre and a dust cap in accordance with the present invention.

The interlocking connection between the engagement tabs 142 and the receiving slots 123 is depicted in greater detail in FIG. 3. The insertion of the engagement tabs 142 into the receiving slots is depicted, alongside the concomitant alignment of the plurality of grooves 121 and the second plurality of grooves 141. When the dust cap 140 is in position, the dust cap 140 and the ferrule holder 120 are joined to form a single bullet shaped member.

Figure 4:
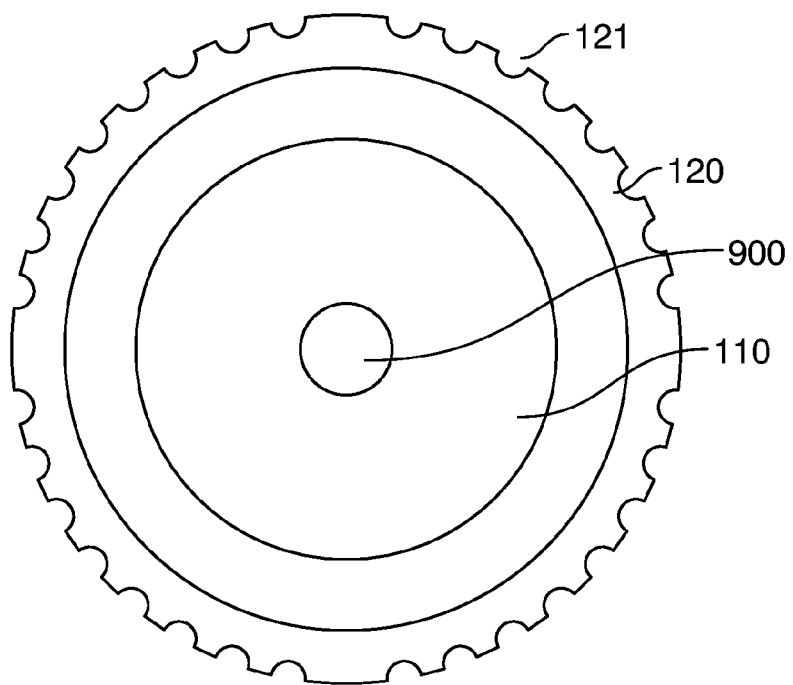
FIG. 4 is a schematic end on view of a fibre optic ferrule in accordance with the present claimed invention.

FIG. 4 illustrates an end on view of the optical fibre ferrule assembly 100. Here, it can be seen that the diameter of the ferrule holder 120 is greater than both that of the termination piece 110 and the compression spring 130. The outer diameter of the ferrule holder is 3 mm. Additionally, the optical fibre 900 runs along the centre of the optical fibre ferrule assembly 100.

FIG. 4 further illustrates the form and position of the plurality of grooves 121 around the outer perimeter of the ferrule holder 120. Again, it can be seen the plurality of grooves 121 are evenly distributed around the perimeter of the ferrule holder 120, and that the plurality of grooves 121 are evenly spaced in relation to each other. Additionally, it can be seen that the grooves which form the plurality of grooves 121 are have a curved base, defining a groove channel which is approximately semi-circular in shape. Each groove which forms the plurality of grooves 121 has a smooth surface, with a constant radius of curvature.

Figure 5:
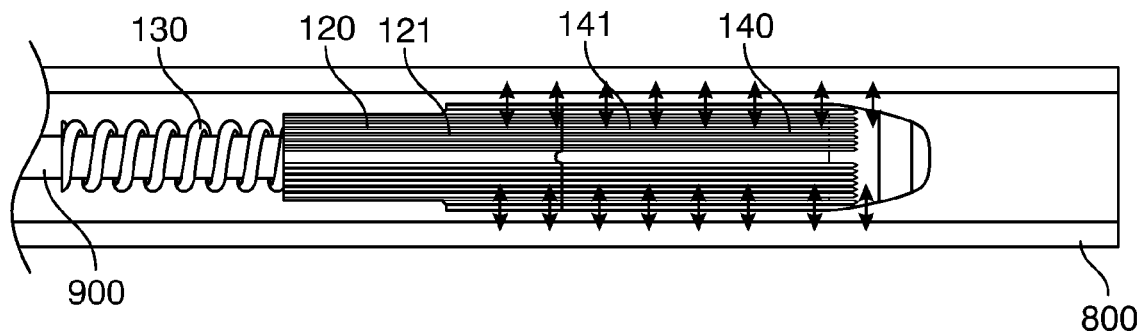
FIG. 5 is a schematic cross sectional view of the fibre optic ferrule and dust cap within an installation tube.

FIG. 5 illustrates the passage of the fibre optic ferrule sub assembly 100 through an installation tube 800 during a fibre blowing or jetting process. Here, the fibre optic ferrule sub assembly 100 is inserted into a pre-positioned installation tube 800 before being propelled, pushed, jetted or blown along the length of the installation tube with a compressed air source. During this blowing process, the compressed air introduced into the installation tube 800 moves past the exterior of the ferrule holder 120 and the dust cap 140 via their grooved surfaces.

In this way, the air forms a cushion or barrier, depicted by arrows in FIG. 5, between the exterior surfaces of the ferrule holder 120 and the dust cap 140, preventing the optical fibre or components of the fibre optic ferrule from contacting the walls of the installation tube 800. As such, the grooved or channeled exterior of both the ferrule holder 120 and the dust cap 140 reduces the friction between the fibre optic ferrule sub assembly 100 and the installation tube 800, increasing the ease with which the optical fibre 900 may be installed. In addition to the provision of this air cushion, the presence of a grooved surface on both the ferrule holder 120 and the dust cap 140 results in a reduced contact area between the fibre optic ferrule sub assembly 100 and the installation tube 800, resulting in a further reduction in friction.

To ensure the air supplied by the compressed air source centres the fibre optic ferrule sub assembly 100 in the installation tube 800, the outer diameter of the fibre optic ferrule sub assembly 100 is optimised to be a maximum of 85% of the inner diameter of the installation tube 800 through which it passes. For further optimisation, the diameter of the fibre optic ferrule sub assembly 100 should be between 75% and 85% of the inner diameter of the installation tube 800 through which it passes.

The shape and form of the plurality of grooves 121 and the second plurality of grooves 141, combined with the maximum 85% outer diameter of the fibre optic ferrule sub assembly 100 with respect to the inner diameter of the installation tube 800 enables an air cushion to be created diametrically around the fibre optic ferrule sub assembly 100 when installation air pressure is applied in a jetting or blowing process. This air cushion balances the fibre optic ferrule sub assembly 100 in the installation tube 800 to provide reduced friction, improved speed of deployment and greater potential installation range.

Additionally, the shape and form of the grooves which form both the plurality of grooves 121 and the second plurality of grooves 141 reduce the mass of the ferrule holder 120 and dust cap 140 respectively, lightening the fibre optic ferrule sub assembly 100 to offer further improved speed of deployment and greater potential installation range.

During installation, the fibre optic ferrule sub assembly 100 passes freely through the installation tube 800 when the installation tube is both straight or formed to its minimum bend radius. In this way, it is ensured that the fibre optic ferrule sub assembly 100 emerges unhindered from the end of the installation tube 800. Upon exiting the installation tube 800, the dust cap 140 is removed from the fibre optic ferrule sub assembly 100, and a connector kit assembled around the fibre optic ferrule sub assembly 100 to create an SC connector interface. This process is illustrated in FIG. 6.

Figure 6:
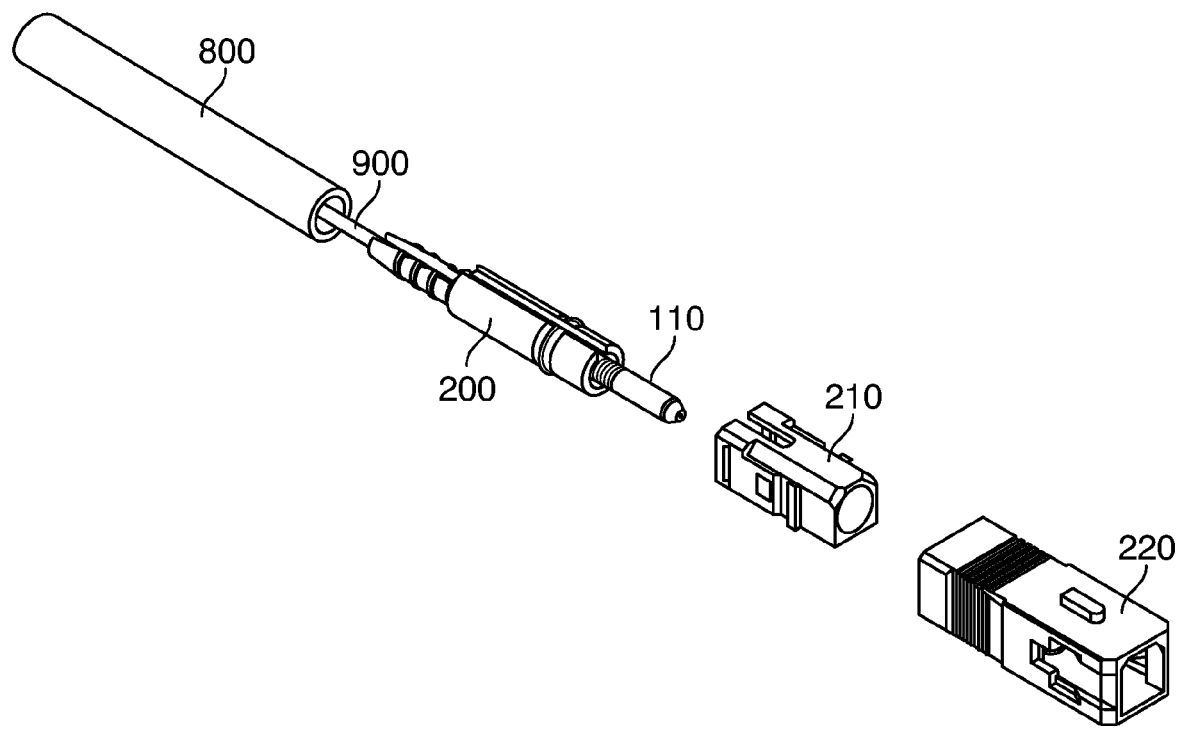
FIG. 6 is a schematic illustration of the fibre optic ferrule and its integration into an SC connector.

In FIG. 6, it can be seen that the termination piece 110, the fibre optic ferrule sub assembly 100 and the attached optical fibre 900 have exited the installation tube 800. The dust cap 140 has been removed from the remainder of the fibre optic ferrule sub assembly 100. To complete the creation of the SC connector interface, the SC rear body 200 is connected to the ferrule holder 120. In this connection, the asymmetric D profile of the second section 122 of the ferrule holder 120 is located and aligned with the corresponding section of the SC rear body 200. This process ensures the correct orientation of the fibre optic ferrule sub assembly 100 is achieved, and minimises angular rotation of the SC connector around the longitudinal axis of the optical fibre. No tooling is required to make this connection between the SC rear body 200 and the ferrule holder 120. Additionally, in this embodiment of the invention, the outer surface of the SC rear portion 200 comprises ribs or ridges 211.

After the connection of the SC rear body 200 to the ferrule holder 120, the SC connector is further constructed or formed with the addition of a housing 210. This housing 210 is connected or fixed to the SC rear body 200 such that it surrounds the SC rear body 200, in this case substantially enclosing the SC rear body 200. Finally, the construction or formation of the SC connector is completed with the addition of the shroud 220, which surrounds the housing and to form the final SC connector, depicted in FIG. 7.

Figure 7:
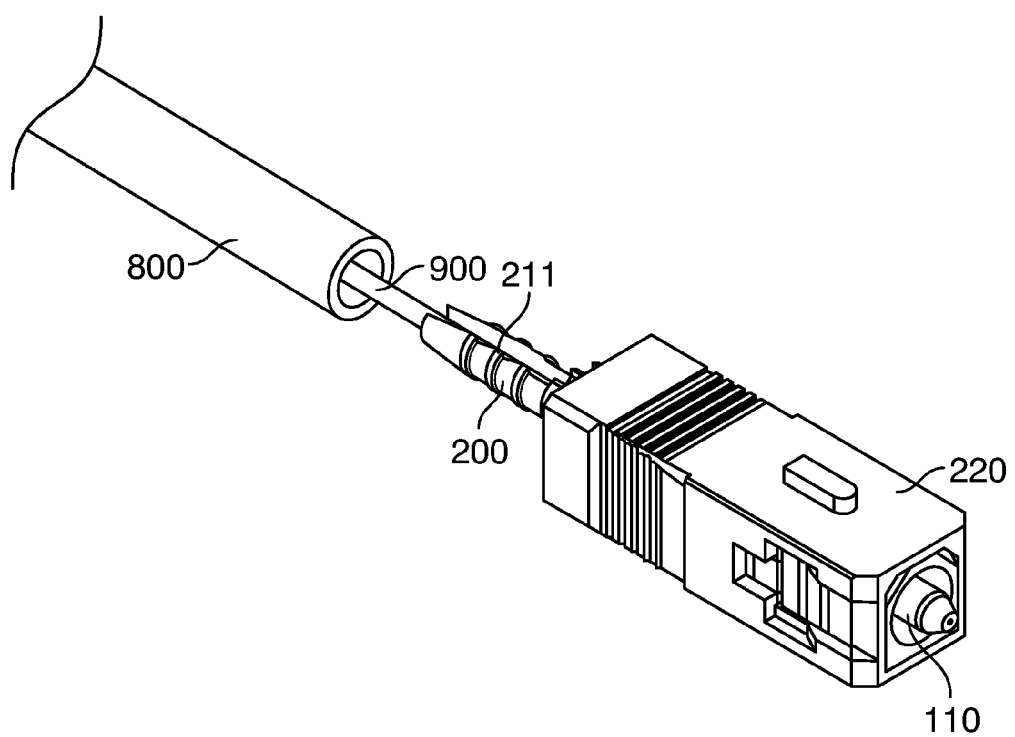
FIG. 7 is a schematic illustration of the SC connector and optical fibre in combination.

FIG. 7 shows the completed SC connector, wherein the termination piece 110 protrudes slightly from an end of the shroud 220. The SC rear portion 200 protrudes from an end of the shroud 220 opposite to that form which the termination piece 110. The SC rear portion 200 extends along the length of the optical fibre 900, substantially surrounding the optical fibre 900.

As the SC rear portion 200 substantially surrounds the optical fibre 900, it effectively increases its outer diameter. Therefore, the outer diameter of the SC rear portion 200 and the optical fibre 900 in combination may be chosen such that it is substantially similar to the diameter of the installation tube 800. Additionally, the outer surface of the SC rear portion 200 comprises ribs or ridges 211. Subsequently both the SC rear portion 200 and the installation tube 800 may be over-sleeved with a flexible tube, to complete assembly of the SC connector and the installation of the optical fibre.

No tooling is required during the assembly of the SC connector. Therefore, it may be undertaken by either the installer or the final user of the optical fibre system at the site of the installation, further increasing the ease with which the optical fibre may be installed.

The invention claimed is:

1. A fibre optic blowing accessory for attachment to the end of an optical fibre, the fibre optic blowing accessory comprising a plurality of grooves extending longitudinally along a portion of its outer surface, wherein a portion of the fibre optic blowing accessory comprises an asymmetric D profile,
   wherein the fibre optic blowing accessory comprises both a fibre optic ferrule holder and a dust cap, and
   wherein the fibre optic ferrule holder or the dust cap comprises engagement means to locate the fibre optic ferrule holder and the dust cap in a position adjacent each other.

2. The fibre optic blowing accessory of claim 1, wherein the fibre optic blowing accessory comprises a fibre optic ferrule holder.

3. The fibre optic blowing accessory of claim 1, wherein the fibre optic blowing accessory comprises a dust cap.

4. The fibre optic blowing accessory of claim 1, wherein the plurality of grooves run parallel to one another.

5. The fibre optic blowing accessory of claim 1, wherein the plurality of grooves run parallel to a longitudinal axis of the fibre optic blowing assembly.

6. The fibre optic blowing accessory of claim 1, wherein the grooves which comprise the plurality of grooves are equally distributed around a perimeter of the fibre optic blowing accessory.

7. The fibre optic blowing accessory of claim 1, wherein the grooves which comprise the plurality of grooves are evenly spaced around a perimeter of the fibre optic blowing accessory.

8. The fibre optic blowing accessory of claim 1, wherein the plurality of grooves comprises at least 16 grooves.

9. The fibre optic blowing accessory of claim 1, wherein the plurality of grooves extends longitudinally along the majority of the outer surface of the fibre optic blowing assembly.

10. The fibre optic blowing accessory of claim 1, wherein both the fibre optic ferrule holder and the dust cap comprise a plurality of grooves extending longitudinally along a portion of their outer surfaces.

11. The fibre optic blowing accessory of claim 1, wherein the engagement means locates the fibre optic ferrule holder and the dust cap in a position such that the plurality of grooves extends substantially continuously across both the dust cap and the fibre optic ferrule holder.

12. The fibre optic blowing accessory of claim 1, wherein the fibre optic blowing accessory is attached to an optical fibre.

13. A kit of parts comprising the fibre optic blowing accessory of claim 1 and an installation tube, wherein the fibre optic blowing accessory has an outer diameter between 75% and 85% of the inner diameter of the installation tube.

14. A method of installing an optical fibre in an installation tube, the method comprising:
   providing an optical fibre terminated in a fibre optic blowing accessory comprising a plurality of grooves extending longitudinally along a portion of its outer surface, wherein a portion of the fibre optic blowing accessory comprises an asymmetric D profile;
   inserting the end of the optical fibre terminated with the fibre optic blowing accessory into an installation tube; and
   providing a source of compressed air to the installation tube, such that the both the fibre optic blowing accessory and the attached optical fibre are blown down the length of the installation tube.

15. A kit of parts according to claim 14, wherein the kit of parts further comprises a connector interface for fixing to the fibre optic blowing accessory.

16. The method of claim 14, wherein the fibre optic blowing accessory has an outer diameter between 75% and 85% of the inner diameter of the elongate installation tube.

* * * * *